Patented June 1, 1937

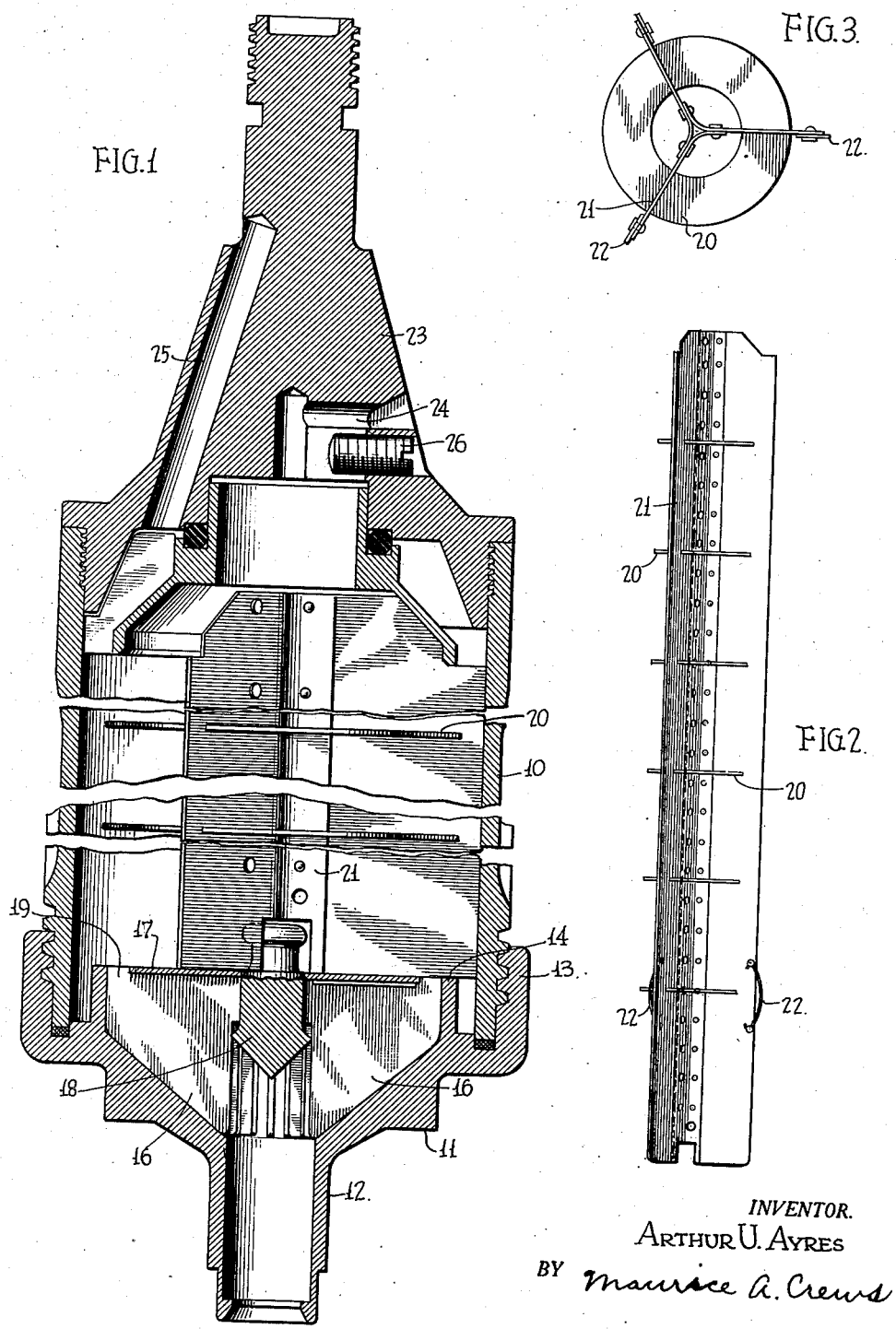

2,082,608

UNITED STATES PATENT OFFICE 2,082,608

CENTRIFUGAL SEPARATOR

Arthur U. Ayres, Chestnut Hill, Pa., assignor to The Sharples Specialty Company, Philadelphia, Pa., a corporation of Delaware Application July 21, 1934, Serial No. 736,322

2 Claims. (Cl. 233—28)

The present invention pertains to the art of centrifugal separators. Its conception occurred in connection with research upon the problem of the concentration of emulsions, such as the centrifugation of milk to produce, and separately discharge, a concentrated cream phase and a skim milk phase. While the invention has been found to be particularly useful in connection with concentration problems, such as the cream separating operation referred to above and the concentration of rubber latex emulsions, it will probably find application to other problems of centrifugal separation and it will accordingly be claimed broadly.

The centrifugal separator of the invention was designed for the purpose of producing from whole milk or cream of normal butter-fat content a super-cream containing an unusually high butter-fat content as described and claimed in the patent to Wendt, Reissue 19,123. In the production, handling and use of a cream of the character defined in that patent, it is naturally desirable that a cream of very high butter-fat content (e. g. 80% concentration), and a skim milk containing a minimum proportion of butter-fat, be obtained if possible. Attempts to attain such a high degree of concentration in separators of ordinary design have met with serious difficulties. While the causes of these difficulties have been numerous, the most serious obstacles to attainment of the desired richness of the cream effluent and the desired degree of removal of butter-fat from the skim milk effluent have probably been the following:

(1) Turbulent conditions within the main body of the centrifugal rotor have resulted in an inadequate degree of concentration and/or in requate degree of concentration and/or in redilution of the cream phase to produce cream of undesirably low degree of concentration.

(2) In cases in which cream of a desirably high degree of butter-fat concentration is produced within the rotor, this cream, due to its high viscosity, tends to flow through the rotor much more slowly than does the less concentrated material. There is a tendency for the concentrated material to crest above its discharge outlet and for the less concentrated underlying material to discharge through that outlet, thereby leaving the cream of the desired degree of concentration within the rotor while discharging cream of a lower degree of concentration.

(3) In cases in which the milk or cream fed to the rotor is allowed to pass directly to the inner surface of the material under treatment, (or directly to the wall of the rotor), a part of this newly fed material flows too rapidly through the rotor along the inner or outer surface of the rotor within the bowl, thereby blending with the liquid within the bowl, thereby blending with the cream or skim milk effluent and reducing the concentration of the cream or the adequacy of the skimming operation.

The object of the present invention has been to design a centrifugal machine by the use of which the above-mentioned difficulties can be avoided. In the embodiment of the invention illustrated in the drawing this has been accomplished by a design affording feed of incoming liquid to a part of the rotor which is radially between the inner and outer surface of the liquid within the main body of the rotor, the provision of baffles which avoid flow of liquid longitudinally of the rotor except at the inner and outer surfaces of the liquid under treatment and the combination with these features of features of accelerator wing and discharge outlet arrangement affording a minimum degree of turbulence and consequent remixing of cream or skim milk with material not yet sufficiently subjected to centrifugal treatment.

The details of construction and operation by which the objects of the invention have been accomplished will be better understood by reference to the attached drawing, in which, Figure 1 is a central longitudinal section through a centrifugal separator rotor constructed in accordance with the invention, and in which the wing and baffle structure within the rotor is shown in perspective, Figure 2 is a side elevation of an accelerator and baffle member forming an important part of the machine of my invention, and Figure 3 is an end view of the part illustrated in Fig. 2.

Referring to the drawing by reference characters, the numeral 10 designates the main body portion of a centrifugal rotor having a bottom member 11 secured to its lower end. The rotor, in its general construction, is preferably of the tubular or "Sharples" type. The bottom 11 of the rotor is provided in conventional manner with a downwardly extending hollow boss 12 adapted to receive liquid from a suitable supply conduit, the bowl bottom including also an upwardly extending internally screw-threaded flange 13 adapted to be secured about complemental threads upon the main body 10 of the rotor. A second flange 14 likewise extends upwardly from the base of the bowl bottom, and the flanges 13 and 14 afford between them a space adapted to receive the lower portion of the wall of the main body of the rotor.

A preliminary accelerator wing structure is removably associated with the bottom of the rotor and serves to bring liquid entering the rotor up to the angular speed of the rotor and to direct such liquid into a central radial portion of the main body of the rotor as it leaves the bowl bottom. This accelerator wing structure includes a large number of radially extending wings 16 which are secured to a central top plate member 17 and to a conical deflecting member 18 which includes a handle by means of which the accelerator structure may readily be inserted within the bowl and removed therefrom. The outermost zone of the rotor is sealed against passage of liquid directly into contact therewith by means of the portion of the rotor lying outwardly of the flange 14. The top plate 17 of the bowl bottom accelerator wing structure terminates radially within this flange to provide an annular space 19 between the flange 14 and the outer circumference of the plate 17 between which liquid may flow from the bowl bottom accelerator structure into the main body of the rotor.

It will be seen that the liquid accelerating and directing arrangement described above in its relation to the bottom of the rotor serves to direct liquid entering the rotor into the main body thereof at an angular velocity which is equal to that of the rotor itself and that this structure also directs the liquid into a radial zone of the main body of the rotor which is well within the inner surface of the main body of the rotor proper but which is also very considerably removed outwardly from the radial zone of discharge of cream therefrom.

The main body of the rotor includes wing and baffle structure of novel construction which is adapted to co-operate peculiarly with the bowl bottom structure described above in the attainment of a high degree of concentration and an adequate skimming of material fed to the rotor. This structure includes a plurality of longitudinally spaced annular rings or baffles 20 of substantial radial extent which are arranged at right angles to the axis of the rotor and may be secured to the accelerator wing structure 21 illustrated in Figures 2 and 3. The wings may be of substantially conventional construction and include a plurality of radially extending plates arranged systematically about the axis of the rotor and provided with springs 22 or other suitable means for causing them to be yieldably held in the rotor when inserted therein. By reference to Figures 1 and 3, it will be noted that the wings 21 extend radially beyond the rings or baffles 20 to the inner circumference of the main body 10 of the rotor to afford an accelerating zone between the rings and the rotor wall and that they extend inwardly beyond the inner circumferences of the rings 20 to afford a decelerating zone within those rings. This arrangement insures that the lighter liquid within the inner circumferences of the rings 20 as well as the heavier liquid outside of the outer circumferences of these rings and the liquid between these two zones will be maintained at the speed of rotation of the rotor. The failure to extend the wings 21 radially inwardly beyond the inner circumferences of the rings 20 would result in the attainment of an angular velocity of a part of the concentrated material radially within the rings greater than that of the material within the radial zone occupied by the wings, thereby resulting in undesired turbulence in the inner zone beyond the rings.

The top portion 23 of the rotor may be secured in screw-threaded engagement with the main body portion 10 thereof and includes discharge outlets 24 and 25 communicating with the radial zones of the bowl respectively inside the inner circumferences and outside the outer circumferences of the rings 20. The machine is provided with conventional adjustment screws or weirs as indicated at 26. In the use of the machine, these screws are adjusted to a position in which they lie radially within the inner circumferences of the rings 20 but in which the radial distance between the inner ends of the screws 26 and the inner circumferences of the rings 20 is relatively small, thereby affording a shallow depth of liquid between these radial zones. It will be seen that the rings 20 have their outer circumferences spaced a substantial distance from the inner circumference of the main body 10 of the rotor.

A consideration of the operation of the rotor described above in the concentration of whole milk or cream to produce a super cream such as that discussed above will illustrate the advantages attained by the present invention. In the use of the machine, milk or cream is first fed through the boss 12 into the feed-directing and accelerator wing structure and brought up to the angular speed of the rotor by means of the radially extending wings 16. This milk or cream is then directed through the openings 19 between the outer circumference of the plate 17 and the flange 14 of the rotor bottom into a central radial zone of the main separating compartment of the rotor. It is subjected to a centrifugal concentrating and skimming operation between the zone of discharge into the main body of the rotor and the lowermost ring 20. It will be seen, however, that this lowermost ring precludes flow of liquid directly through the rotor in a longitudinal direction and allows only reasonably concentrated cream or well-skimmed milk to pass longitudinally beyond this lowermost skimming zone around the inner and outer circumferences of the rings respectively.

A similar separating compartment is afforded between each successive pair of rings, the rings thus affording a series of relatively quiescent zones within which concentration of cream may take place with discharge of concentrated cream radially inwardly beyond the inner circumferences of the rings and discharge of skim milk radially outwardly beyond their outer circumferences. It will be seen that this arrangement allows longitudinal flow of liquid beyond the given compartment in which concentration is taking place only after the emulsion has attained a degree of concentration or dilution allowing it to be discharged around the inner or outer edge of the ring 20 forming the upper end of the compartment in question. Since the zones of flow of material through the rotor are annularly restricted to the space between the inner ends of the cream screws 26 and the inner circumferences of the rings 20 on the one hand and between the inner circumference of the rotor 10 and the outer circumferences of the rings 20 on the other hand, the flow in these zones will necessarily be rapid in order to take care of the discharge requirements of the machine in response to the rate of feed of liquid thereto through the boss 12. The rapid rate of flow in the cream discharge zone lying within the inner circumferences of the rings 20 is such as to overcome the high viscosity of the super-cream in this zone and to cause that super cream to flow swiftly and discharge steadily over the screws 26 and through the discharge outlets 24. The rings 20 are preferably of substantial diameter even at their inner circumferences in order to afford a large annular zone within these rings and to avoid the occurrence of an undue depth of concentrated cream therewithin. The provision of accelerator wings which extend radially beyond the inner and outer circumferences of the rings precludes the occurrence of undue turbulence in the cream or skim milk zones and thereby precludes undue remixing of concentrated cream or skim milk with the still inadequately centrifuged material within the radial zone between the inner and outer circumferences of the rings 20.

From the above discussion it will be evident that the machine of the present invention avoids the difficulties referred to in the introductory part of the present specification by affording a feed of liquid directly into a central radial zone of liquid under treatment in the main body of a centrifugal rotor and the centrifugation of the material under treatment in a series of isolated compartments defined by the rings 20 and separate discharge of lighter and heavier effluent from the rotor through the zones annularly inside of the inner and outside of the outer circumferences respectively of the rings 20.

I claim:

1. In a centrifugal separator, the combination comprising a rotor including separate outlets for separated effluents, said discharge outlets communicating with an inner and an outer zone for light and heavy effluents respectively, a plurality of imperforate annular rings within said rotor, said rings being of slightly less radial extent than the depth of the liquid treated in the rotor and being spaced apart substanial distances longitudinally of the rotor and lying in planes substantially perpendicular to the axis of the rotor, the outer diameters of said rings terminating within the radial zone of heavier effluent discharge outlet and their inner diameters terminating outside the radial zone of the lighter effluent discharge outlet, and means to feed material to be treated to a zone of the rotor intermediate the inner and outer diameters of said rings.

2. In a centrifugal separator, the combination comprising a rotor including separate outlets for separated effluents, said discharge outlets communicating with an inner and an outer zone for light and heavy effluents respectively, a plurality of imperforate annular rings within said rotor, said rings being of slightly less radial extent than the depth of the liquid treated in the rotor and being spaced apart substantial distance longitudinally of the rotor and lying in planes subgitudinally stantially perpendicular to the axis of the rotor, the outer diameters of said rings terminating within the radial zone of heavier effluent discharge outlet and their inner diameters terminating outside the radial zone of the lighter effluent discharge outlet, means to feed material to be treated to a zone of the rotor intermediate the inner and outer diameters of said rings, and a plurality of radially extending wings extending radially inwardly beyond the inner circumference of the rings and radially outwardly beyond the outer circumference of the rings.

ARTHUR U. AYRES.